(12) United States Patent
Wadell

(10) Patent No.: US 11,431,379 B1
(45) Date of Patent: Aug. 30, 2022

(54) FRONT-END MODULE

(71) Applicant: Teradyne, Inc., North Reading, MA (US)

(72) Inventor: Brian C. Wadell, North Reading, MA (US)

(73) Assignee: TERADYNE, INC., North Reading, MA (US)

( * ) Notice: Subject to any disclaimer, the term of this patent is extended or adjusted under 35 U.S.C. 154(b) by 0 days.

(21) Appl. No.: 17/219,219

(22) Filed: Mar. 31, 2021

(51) Int. Cl.
*H04B 3/46* (2015.01)
*H04L 27/00* (2006.01)

(52) U.S. Cl.
CPC ........... *H04B 3/46* (2013.01); *H04L 27/0002* (2013.01)

(58) Field of Classification Search
CPC ............... H04B 17/00; H04B 17/0082; H04B 17/0085; H04B 17/10; H04B 17/101–104; H04B 17/11–30; H04B 2203/00; H04B 2203/54; H04B 2203/5462; H04B 2203/5495; H04B 3/46; H04B 3/462; H04B 3/466; H04B 3/48; H04B 3/487; H04B 3/493; H04L 5/00; H04L 5/14; H04L 5/143; H04L 5/1469; H04L 1/24; H04L 1/241–244; H04L 27/0002
See application file for complete search history.

(56) References Cited

U.S. PATENT DOCUMENTS

| | | | | |
|---|---|---|---|---|
| 3,961,273 A * | 6/1976 | Trush | ................... | H03L 7/0812 327/243 |
| 4,808,912 A * | 2/1989 | Potter | ................... | G01R 27/06 324/630 |
| 4,808,913 A * | 2/1989 | Grace | ................... | G01R 27/28 324/630 |
| 4,816,767 A * | 3/1989 | Cannon | ................. | G01R 27/30 324/76.23 |

(Continued)

FOREIGN PATENT DOCUMENTS

| | | |
|---|---|---|
| DE | 3714998 A1 | 11/1988 |
| EP | 0230668 A2 | 8/1987 |

(Continued)

OTHER PUBLICATIONS

Written Opinion received for International Patent Application No. PCT/US2022/022132, dated Jul. 13, 2022, (5 pages).

(Continued)

*Primary Examiner* — James M Perez
(74) *Attorney, Agent, or Firm* — Burns & Levinson LLP

(57) ABSTRACT

An example front-end module includes a channel to connect to a device under test (DUT). The front-end module includes a transmission line between the DUT and the front-end module that is configured for bidirectional transmission of oscillating signals including test signals and response signals, and in-phase and quadrature (IQ) circuitry configured to modulate a test signal for transmission over the transmission line to the DUT and to demodulate a response received over the transmission line from the DUT. The front-end (Continued)

module include at least four taps into the transmission line to obtain direct current (DC) voltage values based on the oscillating signals. Scattering (s) parameters of the channel are based on the DC voltage values. The front-end module includes at least six ports.

31 Claims, 6 Drawing Sheets

(56) References Cited

U.S. PATENT DOCUMENTS

| | | | | | |
|---|---|---|---|---|---|
| 4,839,578 | A | * | 6/1989 | Roos | G01R 27/06 324/638 |
| 4,864,077 | A | * | 9/1989 | Wadell | H05K 9/0049 174/382 |
| 4,894,753 | A | * | 1/1990 | Wadell | H05K 7/1425 361/818 |
| 4,924,399 | A | * | 5/1990 | Kaiser | F02D 41/28 123/480 |
| 5,034,708 | A | * | 7/1991 | Adamian | H01P 5/04 333/263 |
| 5,165,034 | A | * | 11/1992 | Kanuma | G06F 7/57 712/218 |
| 5,276,411 | A | * | 1/1994 | Woodin, Jr. | H03H 7/383 333/116 |
| 5,311,440 | A | * | 5/1994 | Hess, Jr. | G01R 29/10 324/615 |
| 5,371,505 | A | * | 12/1994 | Michaels | H01Q 1/42 324/639 |
| 5,376,938 | A | * | 12/1994 | Martinez | G01S 7/4008 342/132 |
| 5,381,115 | A | * | 1/1995 | Timmons | H03G 1/04 330/289 |
| 5,434,511 | A | * | 7/1995 | Adamian | G01R 35/005 333/17.1 |
| 5,467,021 | A | * | 11/1995 | Adamian | G01R 35/005 324/650 |
| 5,483,158 | A | * | 1/1996 | van Heteren | G01R 33/3628 324/318 |
| 5,493,719 | A | * | 2/1996 | Smith | H01Q 23/00 505/202 |
| 5,572,160 | A | * | 11/1996 | Wadell | G01R 31/3167 324/750.02 |
| 5,581,176 | A | * | 12/1996 | Lee | G01R 31/318558 324/73.1 |
| 5,705,925 | A | * | 1/1998 | Lee | G01R 31/3167 324/73.1 |
| 5,717,329 | A | * | 2/1998 | Lee | G01R 31/3167 324/73.1 |
| 5,731,701 | A | * | 3/1998 | Lee | G01R 31/318558 324/73.1 |
| 6,066,953 | A | * | 5/2000 | Wadell | G01R 31/3167 324/762.01 |
| 6,118,811 | A | * | 9/2000 | Narumi | H04B 17/14 455/84 |
| 6,204,813 | B1 | * | 3/2001 | Wadell | A63B 24/0021 342/463 |
| 7,130,359 | B2 | * | 10/2006 | Rahman | H03D 3/008 375/345 |
| 7,248,625 | B2 | * | 7/2007 | Chien | H04B 17/20 375/219 |
| 7,256,600 | B2 | * | 8/2007 | Walker | G01R 31/31924 324/73.1 |
| 7,539,268 | B2 | * | 5/2009 | Fechtel | H04L 27/368 375/213 |
| 7,672,364 | B2 | * | 3/2010 | Kang | H04L 27/38 455/73 |
| 7,782,928 | B2 | * | 8/2010 | Kang | H04B 17/14 455/73 |
| 7,826,549 | B1 | * | 11/2010 | Aggarwal | H04L 27/362 375/301 |
| 7,856,048 | B1 | * | 12/2010 | Smaini | H04B 1/30 455/115.2 |
| 8,340,167 | B2 | * | 12/2012 | Feng | H04B 17/21 375/325 |
| 8,411,730 | B2 | * | 4/2013 | Maeda | H04B 17/21 375/267 |
| 8,422,540 | B1 | * | 4/2013 | Negus | H01Q 21/28 375/219 |
| 8,989,307 | B2 | * | 3/2015 | Zhou | H03F 1/3258 375/221 |
| 9,203,448 | B2 | * | 12/2015 | Morita | H03F 1/34 |
| 9,276,798 | B2 | * | 3/2016 | Yu | H04L 27/364 |
| 9,341,503 | B2 | * | 5/2016 | Zhuge | G01D 18/00 |
| 9,485,036 | B2 | * | 11/2016 | Kordik | H04B 17/0085 |
| 9,755,766 | B2 | * | 9/2017 | Wadell | H04B 17/0085 |
| 9,780,891 | B2 | * | 10/2017 | Eo | H04B 17/0085 |
| 9,786,977 | B2 | * | 10/2017 | Lyons | H01P 3/082 |
| 9,893,924 | B2 | * | 2/2018 | Smail | H04L 27/265 |
| 9,973,940 | B1 | * | 5/2018 | Rappaport | H01P 7/08 |
| 10,027,358 | B2 | * | 7/2018 | Wu | H03D 7/165 |
| 10,057,795 | B2 | * | 8/2018 | Starzer | H04W 24/06 |
| 10,278,084 | B2 | * | 4/2019 | Starzer | H04B 1/16 |
| 10,326,495 | B1 | * | 6/2019 | Barzegar | H04B 3/54 |
| 10,345,418 | B2 | * | 7/2019 | Wadell | G01R 31/2834 |
| 10,374,838 | B2 | * | 8/2019 | Jiang | H03G 3/3042 |
| 10,469,109 | B2 | * | 11/2019 | Gutman | H03F 3/24 |
| 10,693,529 | B1 | * | 6/2020 | Sissoev | H01Q 1/38 |
| 10,812,136 | B1 | * | 10/2020 | Henry | H04B 3/36 |
| 10,972,192 | B2 | * | 4/2021 | Wadell | G01R 31/2865 |
| 11,057,123 | B1 | * | 7/2021 | Chang | H04B 1/38 |
| 11,128,501 | B2 | * | 9/2021 | Lan | H04L 25/061 |
| 11,272,616 | B2 | * | 3/2022 | Brecht | H05K 1/162 |
| 2003/0169827 | A1 | * | 9/2003 | Shi | H04B 1/406 375/295 |
| 2003/0206603 | A1 | * | 11/2003 | Husted | H04L 27/3863 375/324 |
| 2004/0106380 | A1 | * | 6/2004 | Vassiliou | H04B 17/14 455/73 |
| 2005/0047384 | A1 | * | 3/2005 | Wax | H04W 72/046 455/561 |
| 2005/0240852 | A1 | * | 10/2005 | Inaba | G01R 31/3167 714/740 |
| 2006/0034356 | A1 | * | 2/2006 | Fechtel | H03D 3/008 375/219 |
| 2006/0223457 | A1 | * | 10/2006 | Rahman | H04B 1/0475 455/73 |
| 2006/0279310 | A1 | * | 12/2006 | Walker | G01R 31/31924 324/762.01 |
| 2007/0047634 | A1 | * | 3/2007 | Kang | H04B 17/101 375/281 |
| 2007/0123188 | A1 | * | 5/2007 | Mo | H04B 1/30 455/302 |
| 2007/0189464 | A1 | * | 8/2007 | Schmitt | H04B 3/48 379/1.01 |
| 2010/0093282 | A1 | * | 4/2010 | Martikkala | H04B 17/21 455/63.4 |
| 2011/0026570 | A1 | * | 2/2011 | Feng | H04B 17/21 455/226.1 |
| 2011/0204910 | A1 | * | 8/2011 | Suto | G01R 31/2815 29/829 |
| 2012/0307983 | A1 | * | 12/2012 | Faulkner | H04B 3/46 379/29.1 |
| 2013/0137381 | A1 | * | 5/2013 | Vassiliou | H04B 17/13 455/84 |
| 2014/0036973 | A1 | * | 2/2014 | Au | H04B 1/525 375/221 |
| 2014/0134943 | A1 | * | 5/2014 | Hobbs | H04B 17/21 455/9 |
| 2014/0355655 | A1 | * | 12/2014 | Chakraborty | H04B 1/40 375/219 |
| 2015/0288467 | A1 | * | 10/2015 | Kahrizi | H04B 17/21 370/241 |
| 2016/0087734 | A1 | * | 3/2016 | Kordik | H04B 17/0085 455/67.14 |
| 2016/0216317 | A1 | * | 7/2016 | Chen | H04B 17/29 |
| 2017/0146632 | A1 | * | 5/2017 | Wadell | G01R 31/2834 |
| 2017/0163358 | A1 | * | 6/2017 | Wadell | H04B 17/0085 |

(56) References Cited

U.S. PATENT DOCUMENTS

| | | | |
|---|---|---|---|
| 2017/0170537 A1* | 6/2017 | Lyons | H05K 1/024 |
| 2017/0179999 A1* | 6/2017 | Vassiliou | H04B 1/26 |
| 2017/0195961 A1* | 7/2017 | Chakraborty | H04W 52/0261 |
| 2017/0353876 A1* | 12/2017 | Starzer | H04B 1/16 |
| 2018/0062768 A1* | 3/2018 | Frank | G01R 31/31709 |
| 2019/0349096 A1* | 11/2019 | Wadell | G01R 31/2893 |
| 2020/0106477 A1* | 4/2020 | Nanni | H04B 3/52 |
| 2020/0313711 A1* | 10/2020 | Patton | H04B 1/0458 |
| 2020/0400742 A1* | 12/2020 | Wadell | G01R 31/31908 |
| 2021/0055347 A1 | 2/2021 | Poppe et al. | |
| 2021/0156959 A1* | 5/2021 | Scherz | G01S 7/4017 |
| 2021/0240651 A1* | 8/2021 | Holzmann | G06F 13/4027 |

FOREIGN PATENT DOCUMENTS

| | | |
|---|---|---|
| EP | 0627631 A2 | 12/1994 |
| JP | 05-075675 U | 10/1993 |
| JP | 5365516 B2 | 12/2013 |
| KR | 10-2014-0146057 A | 12/2014 |
| WO | 2017099855 A1 | 6/2017 |

OTHER PUBLICATIONS

International Search Report received for International Patent Application No. PCT/US2022/022132, dated Jul. 13, 2022, (3 pages).

* cited by examiner

US 11,431,379 B1

FRONT-END MODULE

TECHNICAL FIELD

This specification describes examples of front-end modules that may be included in test instruments of a test system.

BACKGROUND

Test systems are configured to test the operation of electronic devices referred to as devices under test (DUTs). A test system may include test instruments to send signals, including digital and analog signals, to a DUT for testing.

SUMMARY

An example front-end module includes a channel to connect to a device under test (DUT). The front-end module includes a transmission line between the DUT and the front-end module that is configured for bidirectional transmission of signals having oscillating amplitudes (referred to herein as "oscillating signals") including test signals and response signals. The example front-end module includes in-phase and quadrature (IQ) circuitry configured to modulate a test signal for transmission over the transmission line to the DUT and to demodulate a response received over the transmission line from the DUT. The front-end module include at least four taps into the transmission line to obtain direct current (DC) voltage values based on amplitudes of the oscillating signals. Scattering (s) parameters of the channel are based on the DC voltage values. The front-end module includes at least six ports. The at least six ports include an input/output (I/O) port directed to signal circuitry, a DUT port directed to the DUT, and at least four ports corresponding to taps into the transmission line. The front-end module may include one or more of the following features, either alone or in combination.

The signal circuitry may include a signal source. The I/O port may be configured to receive a modulated version of the test signal. The signal circuitry may include a signal receiver. The I/O port may be configured to output the response signal towards circuitry of the signal receiver. The taps, which may include at least four taps, obtain DC voltage values based on oscillating signal amplitude at the tap.

The oscillating signals may be within a radio frequency (RF) range, a millimeter (mm) wave frequency range, or a centimeter (cm) wave frequency range. The oscillating signals may have frequencies of at least 55 gigahertz (GHz).

One or more of the at least four taps may include a diode connected to the transmission line and a capacitive-inductive filter in series with the diode, or any similar AC (alternating current) to DC circuit, to obtain a DC voltage value based on an oscillating signal on the transmission line. The transmission line dimensions may vary along its length to compensate the transmission line for impedance changes caused by diodes at the at least four taps. One or more of the at least four taps may include a sampling diode connected to the transmission line. The front-end module may include one or more additional diodes located physically proximate to the sampling diodes for measuring temperature of the sampling diodes.

The connection between the channel and the DUT may be unswitched. The IQ circuitry may include mixer circuitry. The mixer circuitry may include bidirectional circuitry. The mixer circuitry may include a double-balanced mixer. The mixer circuitry may include uni-directional mixers, each of which may be configured to operate in a different direction. The mixer circuitry may be configured to separate signals into two paths comprising a forward path and a reverse path.

The front-end module may be incorporated in a circuit that includes a triplexer to pass oscillating test signal to and from the DUT circuitry, along with a DC voltage, and digital control signals that were generated and/or received, and memory to store calibration values for calibrating. The triplexer is configured to separate and to combine digital control and data signals, oscillating test signal, and DC power. The memory may store s-parameter values associated with s-parameter measurements and calibration. The memory may store gain and phase values associated with the signal path(s). The memory may store temperature values associated with the at least four taps. The memory may store calibration values for the IQ circuitry. The memory may store calibration values to calibrate linearity of the IQ circuitry and to calibrate voltages from the at least four taps.

An example test system includes a front-end module as described previously and one or more processing devices to generate the s-parameters using the DC voltage values by making measurements and combining results mathematically. The one or more processing devices may be configured to generate calibration values during manufacturing. The one or more processing devices may be configured to generate calibration values prior to measuring a DUT.

An example test system includes a front-end module as described previously, a signal source to provide the test signal to the IQ circuitry, a signal receiver to receive the response signal from the IQ circuitry, where the signal source and the signal receiver include the signal circuitry, and an interface board to which the DUT is connected. The channel may be at least partly on the DIB. The front-end module may be an RF test instrument or may be a component of an RF test instrument. The channel may be partly on the interface board. An input to the front-end module may include one or more of an IQ-modulated baseband, an intermediate frequency, a local oscillator (LO) signal, a control signal, or a DC supply signal.

An example test system includes a front-end module that defines a channel to connect to a device under test (DUT). The front-end module includes a transmission line that is connectable to the DUT and configured for bidirectional transmission of oscillating signals including test signals and response signals, and circuitry configured to modulate a test signal for transmission over the transmission line to the DUT and to demodulate a response received over the transmission line from the DUT. The test system may include one or more processing devices to generate scattering (s) parameters for the channel based on direct current (DC) values obtained at different locations along the transmission line. The front-end module may include at least six ports. The at least six ports may include an input/output (I/) port directed to signal circuitry, a DUT port directed to the DUT, and at least four ports for accessing the transmission line at different locations to obtain the DC values. The test system may include one or more of the following features, either alone or in combination.

The oscillating signals may be between an RF frequency range and a millimeter (mm) wave frequency range inclusive. The oscillating signals may have frequencies of at least 55 gigahertz (GHz).

An example test system includes means for enabling bidirectional transmission of oscillating signals between a test instrument and a device under test (DUT), means for obtaining direct current (DC) values representing signal amplitudes of the oscillating signals at different points along the transmission line, and means for generating scattering (s)

parameters based on the DC values. The means for obtaining may include at least one test channel. The at least one test channel may include at least six ports including ports through which the DC values are obtainable. The test system may include one or more of the following features, either alone or in combination.

The oscillating signals may be within an RF frequency range, within a millimeter (mm) wave frequency range, or within a centimeter (cm) wave frequency range. The oscillating signals may have frequencies of at least 55 gigahertz (GHz). The means for enabling may include a transmission line that is connected to the DUT through an unswitched connection. The means for enabling may include in-phase and quadrature (IQ) circuitry.

Any two or more of the features described in this specification, including in this summary section, may be combined to form implementations not specifically described in this specification.

At least part of the systems and apparatus described herein may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the systems and apparatus described herein, or portions thereof, may be implemented as an apparatus, method, or a test system that may include one or more processing devices and computer memory to store executable instructions to implement control of the stated functions. The apparatus, systems, and/or components thereof described herein may be configured, for example, through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
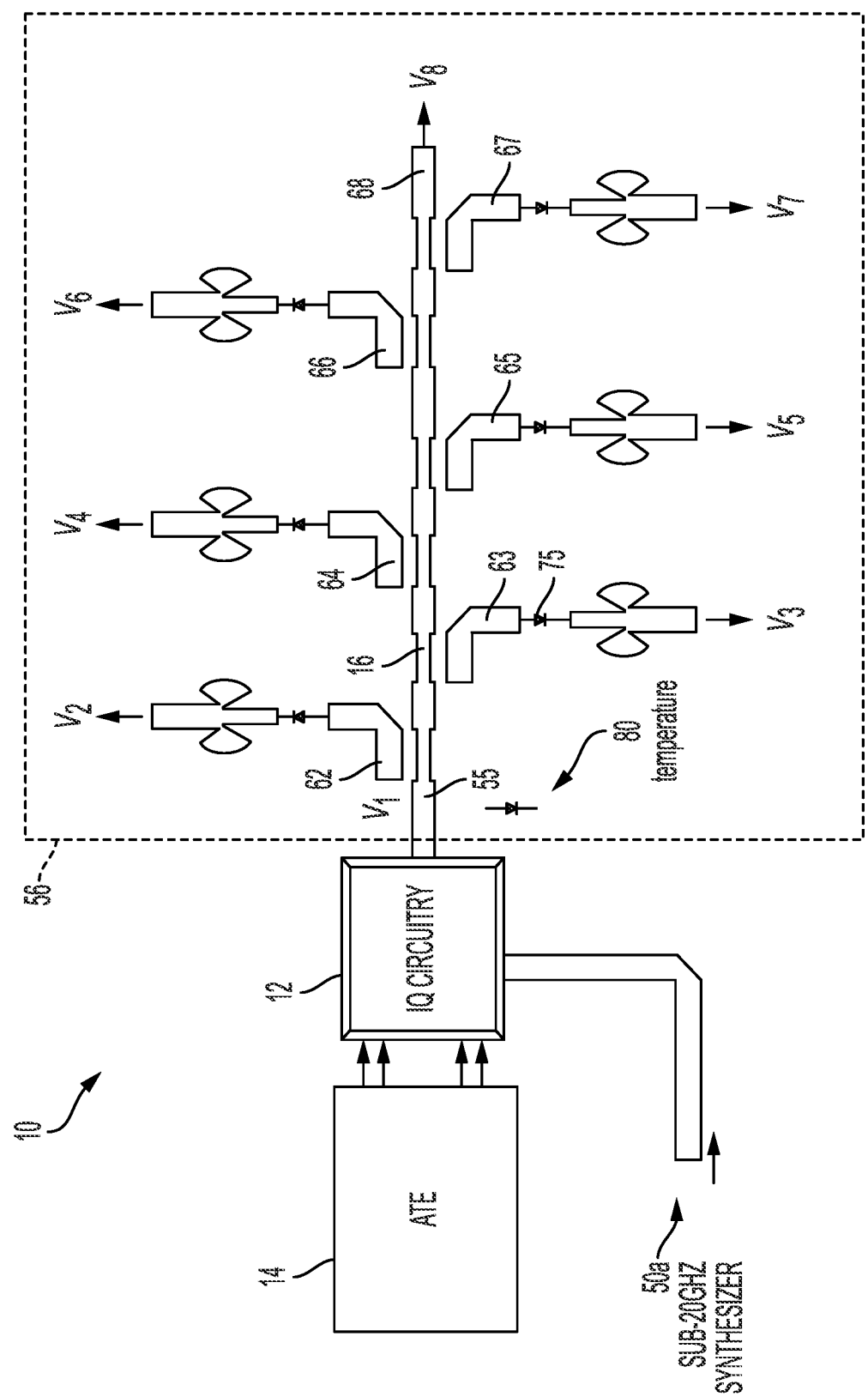
FIG. 1 is a block diagram of an example front-end module.

An example front-end module includes DUT (Device Under Test)—facing circuitry that is configured to communicate over a test channel ("channel"), which may include a transmission line between the front-end module and the DUT. The transmission line may or may not include an electrical conductor. For example, a coaxial cable is a transmission line that is also a conductor (TEM), but a waveguide is a transmission line (TE11) that may not have a conductive piece of metal from its input to its output. Front-end modules commonly include separate transmit and receive circuitry for, respectively, transmitting signals to a DUT and for receiving signals from the DUT.

Described herein are examples of a front-end module, and variants thereof, that connect to, or includes part of, a channel between a DUT and the front-end module. Communications, including signals, between the DUT and the front-end module are exchanged over the channel. The channel may be bidirectional in that signals may be transmitted (or "sourced") and received over the same channel. To support bidirectional signal exchanges over the same channel, the front-end module includes the same circuitry or set of circuits for transmitting and receiving signals over the bidirectional channel. At least part of the channel includes a transmission line that is between the DUT and the front-end module. The channel is configured for bidirectional transmission of signals having oscillating amplitudes ("oscillating signals") including, but not limited to, radio frequency (RF) signals. The front-end module also includes in-phase (I) and quadrature (Q) (IQ) circuitry configured to modulate an oscillating test signal ("test signal") for transmission over the transmission line towards the DUT and to demodulate an oscillating response signal ("response signal") received over the transmission line from the DUT. In this example, the IQ circuitry includes the "same circuitry" described above that enables transmitting and receiving signals bidirectionally.

In some implementations of the front-end module, there are at least four (e.g., four or more) taps into the transmission line to obtain direct current (DC) voltage values based on amplitudes of the oscillating signals. Example taps include, but are not limited to, a resistor touching the transmission line on one side of the resistor and touching a diode on the other side of the resistor and a second transmission line coupled to the main transmission line and to a diode. Scattering (s) parameters of the channel are based on the DC voltage values obtained through the taps. Example s-parameters describe the electrical behavior of the DUT. Including the taps, there are at least six (e.g., six or more) ports on the front-end module. The six or more ports include an input/output (I/O) port directed to signal circuitry, a DUT port directed to the DUT, and at least four ports for the at least four taps. The I/O port may be directed to the signal circuitry in the sense that the I/O port is along an electrical pathway containing circuitry configured to transmit or to receive oscillating signals or data therefor. The DUT port may be directed to the DUT in the sense that the DUT port is along an electrical pathway over which communications with the DUT are exchanged.

Examples of oscillating signals that may be transmitted and received using the front-end modules described herein include oscillating alternating electric current and/or voltage signals. Example oscillating signals include, but are not limited to, signals that are within the RF range, the centimeter (cm) wave frequency range, and/or the millimeter (mm) wave frequency range. In an example definition, an RF signal has a frequency range of about 20 kilohertz (kHz) to about 3 gigahertz (GHz). In an example definition, a centimeter-wave signal has a frequency range of about 3 GHz to about 30 GHz. In an example definition, a mm-wave signal has a frequency range of about 30 GHz to about 300 GHz. In an example definition, a mm-wave signal has a frequency range of about 110 GHz to about 300 GHz. In some implementations, the frequency range of the oscillating signals is between an RF frequency range and a mm-wave frequency range inclusive. The definitions of RF, mm-wave, and centimeter-wave may change over time and in different jurisdictions. As such, signals labeled herein as RF, mm-wave or centimeter-wave are not limited to the preceding numerical frequency ranges. Other examples of signals that may be transmitted and received using the example front-end modules described herein include, but are not limited to signals have frequencies of at least 55 GHz (that is, 55 GHz and over).

In some implementations, the front-end module described herein may be a test instrument, such as an RF test instrument, that is part of a test system or the front-end module may be included in a test instrument that also performs other functions.

Figure 2:
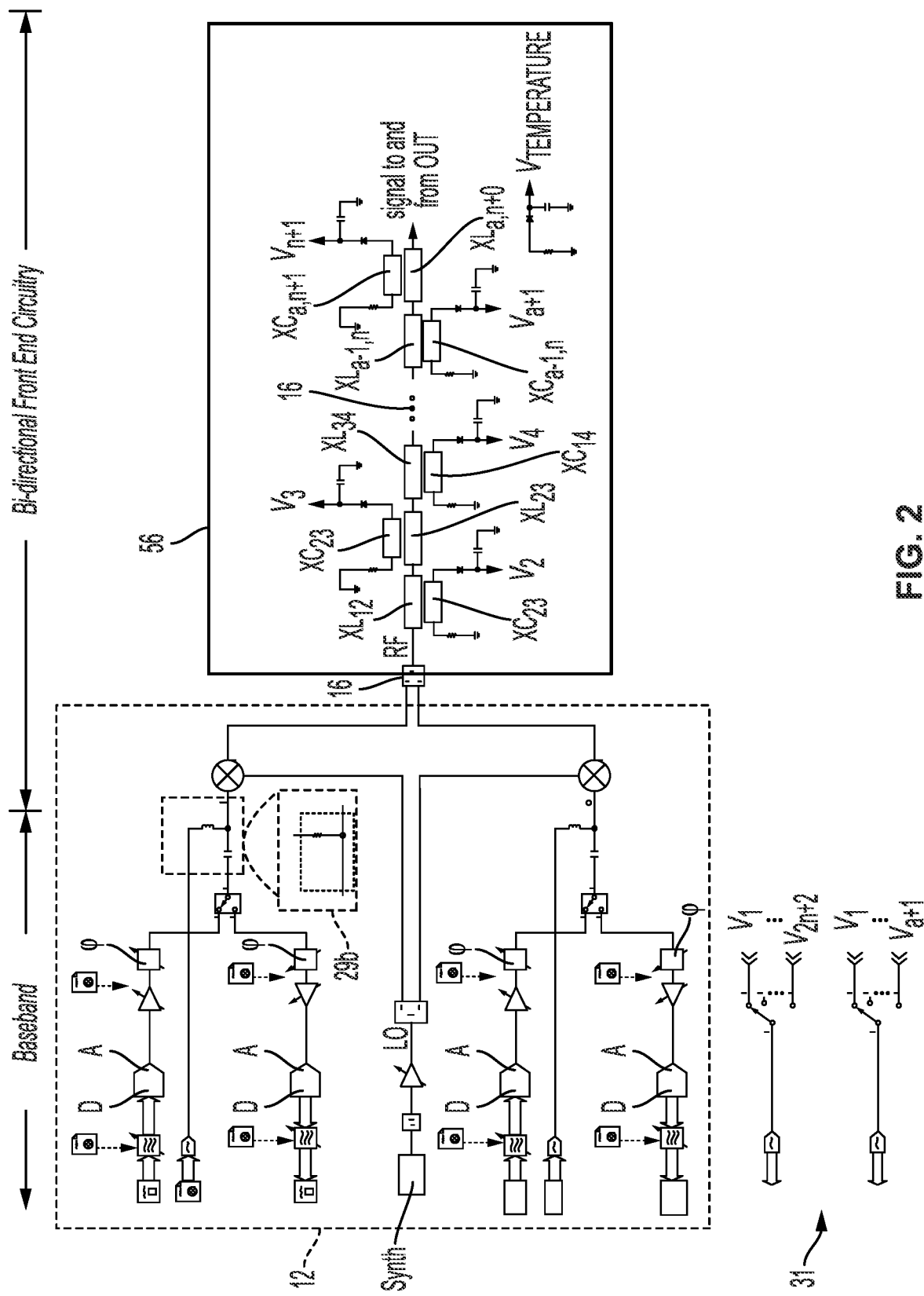
FIG. 2 is a diagram showing example circuit components that may be included in the example front-end module.

FIG. 1 shows components that may be included in an example front-end module 10 of the type described herein. Example front-end module 10 includes IQ circuitry 12 configured to modulate a test signal from automatic test equipment 14 for transmission over a channel 16 to the DUT and also to demodulate a response signal received over the same channel from the DUT. IQ circuitry 12 includes bidirectional circuitry, an example of which is shown in FIG. 2 and in close-up in FIG. 3. The bidirectional circuitry in IQ circuitry 12 is configured to separate signals on the same physical transmission line, such as a transmission line that implements the channel, into two paths, including a forward (or transmit) path and a reverse (or receive) path. In some implementations, the connection between channel 16 and the DUT (not shown) is unswitched in that signals may be transmitted back-and-forth absent use of, or control over, switching circuitry that dedicates the line for transmission in one direction. In some implementations, the unswitched connection allows for a direct or substantially direct connection, via a transmission line, between the DUT and IQ circuitry 12.

In this example, IQ circuitry 12 is configured to modulate a high-frequency carrier signal (a local oscillator) with an information signal (baseband I and Q signals in this example) received from ATE 14 or based on signals received from ATE 14. This information signal may represent, or be based on, a test signal that is used for testing the DUT. IQ circuitry 12 is also configured to demodulate a response signal into a high-frequency carrier signal and an information signal. This information signal may include test results provided from a DUT that are based on test performed using the test signal.

Figure 3:
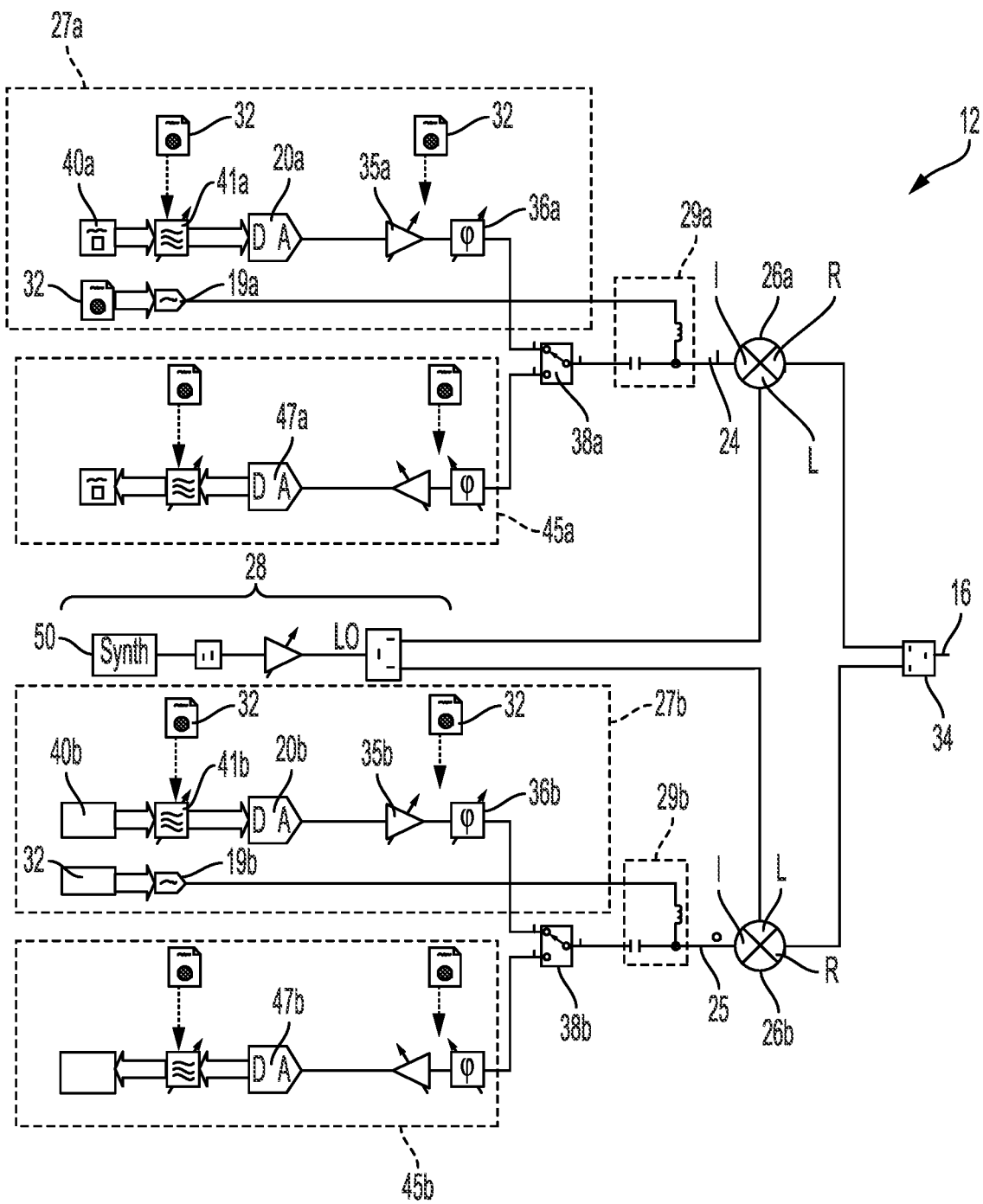
FIG. 3 is a close-up view of circuit components that may be included in example IQ (in-phase-quadrature) circuitry that is part of the front-end module.

Referring to FIGS. 2 and 3, by proper manipulation of data driving I digital-to-analog converter (DAC) 20a and Q DAC 20b connected to I port 24 and Q port 25, respectively, different modulation formats can be implemented using IQ circuitry 12 in combination with appropriate software. Examples of modulation formats that may be supported by IQ circuitry 12 include, but are not limited to, AM (amplitude modulation), FM (frequency modulation), PSK (phase-shift keying), 64-QAM (quadrature amplitude modulation), and communication protocols such as IEEE (Institute of Electrical and Electronics Engineers) 802.11ac, 802.11ax, and 802.11 ay for wireless connectivity and 3GPP (3rd Generation Partnership Project) standards for mobile phones. Radar signals and single sideband signals for use as an IF (intermediate frequency) to subsequent stages may also be generated using IQ circuitry 12.

IQ circuitry 12 includes mixer circuitry 26a, 26b ("mixer" or "mixers"). In an example, mixer circuitry 26a, 26b is configured to separate signals on the same physical transmission line into two paths, including the forward path and the reverse path described previously. Mixer circuitry 26a, 26b includes bidirectional circuitry such as a double-balanced mixer. In some implementations, this bidirectional circuitry includes two (or more) uni-directional mixers, each of which configured to operate in a different direction. For example, one uni-directional mixer may be configured to operate in the forward path and one uni-directional mixer may be configured to operate in the reverse path.

In an example implementation, IQ circuitry 12 includes modulator modules 27a, 27b, which may include mixers 26a, 26b of the type described previously and associated local oscillator circuitry 28 for generating a local oscillator signal. Module 27a is described. Module 27b includes counterpart circuitry labeled "b" instead of "a".

In module 27a, DAC 19a is configured to drive a bias-T circuit 29a (or other type of AC-signal blocking circuit), which is comprised of an inductor and a capacitor, to add offsets for calibration (the calibration values noted below) to IQ modulator mixer 26a if needed. DAC 19a may be configured using one or more calibration values stored, for example, in non-volatile memory 32 labeled "CAL". Memory 32 is loaded by generating a signal, measuring the signal, and adjusting the DAC for ideal mixer performance, which may include local oscillator rejection. The resulting values are then stored in memory 32 and may be reused at a future time. If direct current (DC)-coupling is required to interface (IF) port 34, the inductor and capacitor can be substituted in the bias-T circuit 29a with resistors or other combining circuitry 29b (FIG. 2) that may include, but is not limited to, an operational amplifier.

DACs 20a, 20b are configured to drive I port 24 and Q port 25, respectively, when sourcing signals. In this configuration, switches 38a and 38b are controlled to connect mixers 26a, 26b to the modulator modules and each DAC 20a, 20b receives data from source memory (SMEM) 40a, 40b. Arbitrary waveform generators 41a, 41b may be configured to generate modulating signals for the data.

DAC 20A and 20b may also be calibrated using calibration data from memory 32 above to correct, if needed, a gain of I(f), a gain of Q(f), a phase of I(f), and/or a phase of Q(f) to improve operation of IQ circuitry 12. This can be done by modifying the samples or digital signal processing or programmable analog elements such as 35a, 36a. The same is true for 47a and 47b, only the other direction. In general, this correction would be applied over the entire signal modulation bandwidth.

In some implementations, programmable gain block 35a and phase block 36a in module 27a (and their counterparts in module 27b), are driven by stored calibration values, which were created during a calibration setup operation to adjust for ideal IQ modulator performance. Calibration may be performed, for example, to account for signal degradation above the 55 GHz frequency band. For example, the calibration values may calibrate linearity of the IQ circuitry and/or calibrate voltage values obtained from the taps. The calibration setup may be performed in order to reduce or to minimize local oscillator signal leakage, balanced sidebands, and residual sidebands. In some implementations, the stored calibration values are generated by a computing device, which may include one or more processing devices or other computing devices described herein, during manufacture of the front-end module Like the modulator modules, the demodulator modules have corresponding constructions. Module 45a is described. Module 45b includes counterpart circuitry labeled "b" instead of "a". In this regard, analog-to-digital (ADC) converters 47a, 47b are configured to digitize signals from port 34 when switches 38a, 38 connect mixers 26a, 26b to the demodulator modules. Digital signals from the demodulator modules can then sent to a digital signal processor (DSP) or other appropriate processing device or circuitry internal or external to the signal receiver to perform demodulation and to obtain various signal quality measurements such as error vector magnitude (EVM) and adjacent channel leakage ratio (ACLR). The remaining components of the demodulator modules are similar to those described herein with respect to the modulator modules 27a, 27b.

Synth block 50 include one or more synthesizers configured to generate local oscillator signals used to drive mixers 26a, 26b. This is optimally represented by a sub-20 GHz synthesizer input 50a in the example of FIG. 1. Local oscillator signal amplitudes may be adjustable in order to optimize drive levels of mixers 26a, 26b to improve linearity as frequency is changed. A controller, which may be part of the ATE or may be implemented using a separate controller may be configured—for example, programmed—to compensate for multiplier flatness, path losses, and other deficiencies that may arise. The controller may also be configured to control operation of switches 38a, 38b.

Figure 4:
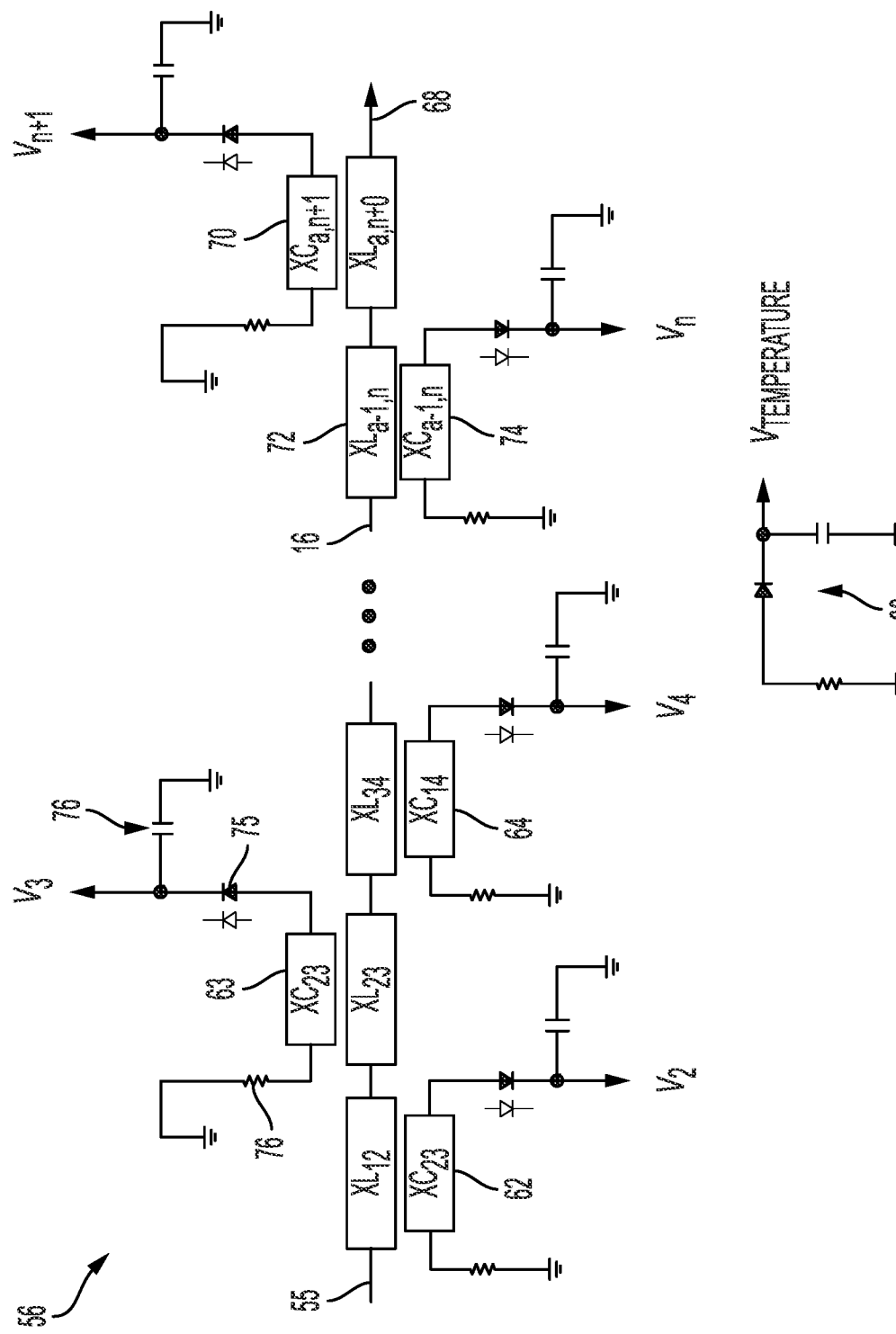
FIG. 4 is a close up view of ports included on an example channel that is, at least in part, included on the front-end module.

Referring to FIGS. 1 and 4, I/O port 55 is directed to signal circuitry, which may be part of ATE 14. In this example, the signal circuitry includes a signal source, which may provide an oscillating test signal (or digital data therefor) to be modulated by IQ circuitry 12. I/O port 55 is configured to receive a modulated version of a test signal. The signal circuitry also includes a signal receiver. I/O port 55 is configured to receive a response signal from a DUT and to output the response signal towards signal receiver circuitry, which may be part of ATE 14. In some implementations, the IQ circuitry along with its ADC (analog-to-digital converter) and signal processors such as an FPGA (field programmable gate array), a CPU (central processing unit), or a DSP (digital signal processor) make up the signal receiver. In some implementations, samples may be processed local to the IQ circuitry in an FPGA or CPU or the samples may be processed on an ATE computer or ATE DSP that are remote to the IQ circuitry. In some implementations, the signal source and the signal receiver may be a single device. In some implementations, the signal source and the signal receiver may be multiple devices.

FIGS. 1 and 4 shows examples of ports 56 on channel 16. As noted above, in some implementations, there are at least four taps into the transmission line of channel 16 to obtain direct current (DC) voltage values representing amplitudes of the oscillating signals. In the example of FIG. 1, there are six taps 62, 63, 64, 65, 66, and 67 into the physical transmission line included in channel 16, which are configured to obtain the DC voltage values based on the oscillating signals. There are also one I/O port 55 and a DUT port 68 directed to the DUT. Therefore, this example includes eight ports total—the six taps plus the I/O port and the DUT port. Some implementations, may include greater than six taps and, therefore, greater than eight ports total. The example of FIG. 4 shows that there may be any number (n+1) ports 70.

The taps maybe loosely electrically coupled to the transmission line via capacitance in the tap and inductance in the transmission line. For example, referring to FIG. 4, the inductive reactance (XL) 72 corresponds to the inductance of the transmission line and the capacitive reactance (XC) 74 corresponds to the capacitance of the coupled tap. In some examples, the circuitry that is coupled, including the tap, is referred to as a butterfly circuit, which may include two radial stubs. The butterfly circuit and adjoining traces create an inductive-capacitive-inductive (LCL) filter. The taps may be used to measure, via respective diodes in the taps, scalar power or voltage ($V_2$, $V_3$, $V_4$, $V_5$, $V_6$, $V_7$ of FIG. 1) at different points of the signal as a signal propagates down the transmission line. That is, at different points along the transmission line, the signal will have different amplitudes (because it is oscillating), which correspond to power or voltage values at those points along the transmission line. These scalar values may then be used to calculate the desired magnitude and phase vectors corresponding to the signal. From those vectors, the s-parameters can be determined. In FIG. 1, $V_1$ is the signal from the source and $V_8$ is the output signal to the DUT. These may be the same signal or different signals accounting for degradation.

One or more (for example, all) of taps 62 to 67 may include a diode such as diode 75 (FIG. 4) connected in series with the transmission line of the channel and a capacitive-inductive filter 76 (see, e.g., $V_3$ FIG. 4) to obtain a DC voltage value corresponding to an amplitude of an oscillating signal on the transmission line. The presence of diodes connected to the transmission line may affect the properties thereof relating to signal transmission. Accordingly, the dimensions, such as length and cross-sectional area, of the transmission line dimensions may be varied to compensate a transmission line that includes the conductor for increases in capacitance caused by the diodes. For example, the transmission line may be configured to increase its inductance. In some implementations, the composition of the transmission line may be varied to compensate the transmission line for changes caused by the diodes.

The diodes described previously may be sampling diodes. A sampling diode may be configured—for example, biased—to detect (that is, to sample) portions of a signal on the transmission line, as described previously. Front-end module 10 may also include one or more measuring diodes 80 (FIGS. 1 and 4) physically located proximate to the sampling diodes for measuring temperature of the sampling diodes. The temperature diodes may be used to correct for any system temperature variations or errors in the diode voltage from temperature. FIG. 2 shows example converters 31 configured to interface the sampling diodes to the transmission line.

As explained previously, s-parameters of the channel may be determined based on the DC voltage values obtained via the taps. For example, the ATE, an example of which is described below, may include one or more processing devices to generate the s-parameters using the DC voltage values.

Figure 5:
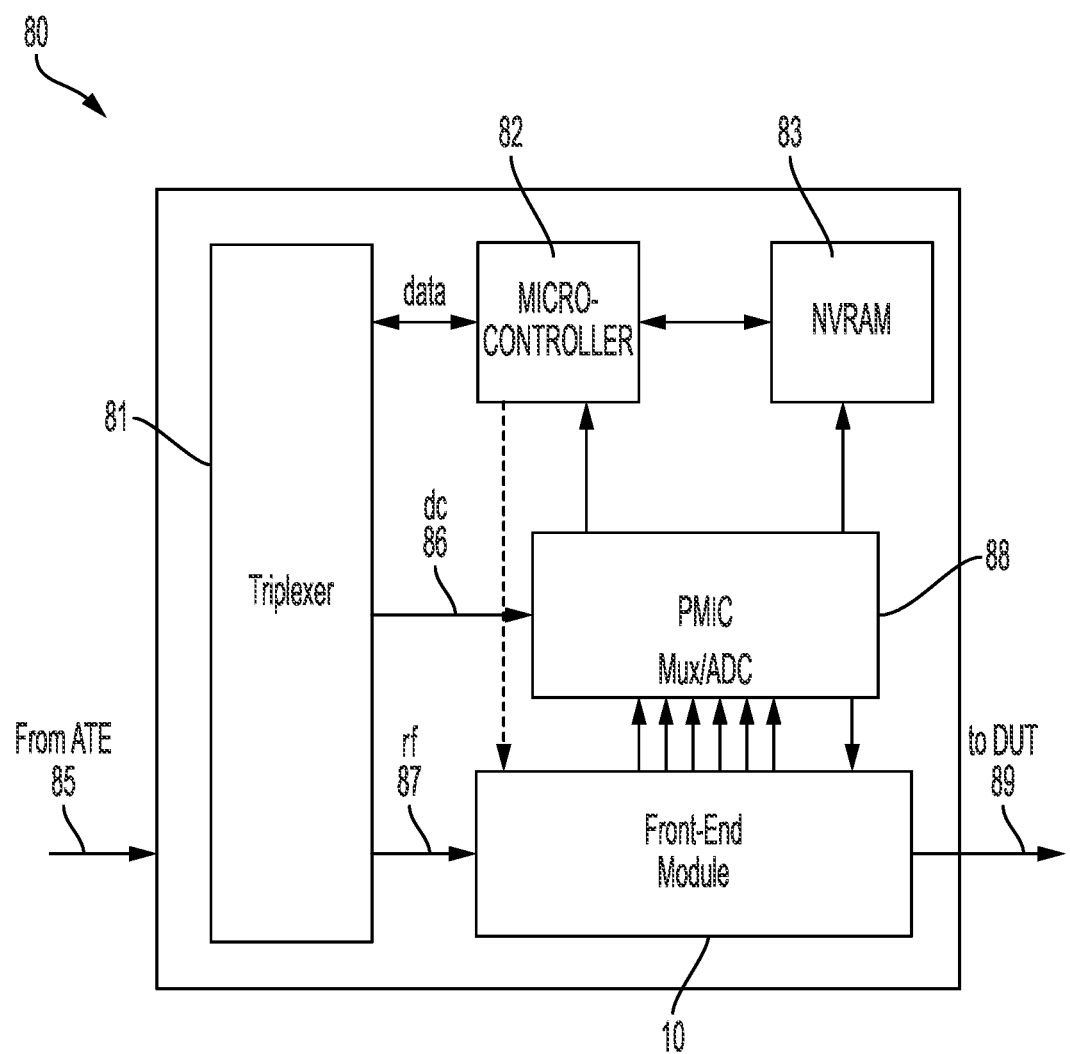
FIG. 5 is a block diagram of components included on an example integrated circuit or multi-chip module that includes the example front-end module.

FIG. 5 shows an example component 80 that incorporates the front-end module 10 described herein. In addition to front-end module 10, component 80 includes a triplexer (TRI) 81, a microcontroller 82, and non-volatile random access memory (NVRAM) 83. Memory 83 stores calibration values for use calculating error corrections, which include at least one of calibrating the voltage values from the at least four taps, correcting for temperature, or calibrating s-parameter measurements. Front end-module 10 operates as described herein. Microcontroller 82 is configured—for example, programmed—to control switching in the IQ circuitry described herein and to read the several diode voltages. The microcontroller is also configured extract and to insert control signals and data into the triplexer. NVRAM 83 stores the calibration values that are used by the microcontroller to store calibration readings and correct measurements. Triplexer 81 is configured to receive a signal, such as an RF signal 85, from a signal source, to remove its DC component 86, and to direct the resulting RF signal 87 to the front end module 10, as shown thus achieving full remote functionality over a single coaxial connection (as done in remote FM repeaters, for example). In this regard, triplexer 81 is configured to separate and to combine digital control and data signals, oscillating test signal, and DC power. Power management integrated circuit (PMIC) 88 is configured to receive a DC signal from triplexer 81, power the components, and to manage power operations of the various circuits. PMIC 88 is also configured to receive the power or voltage values from the diodes in the taps, to perform ADC, and to provide those digital values to the microcontroller, as shown in FIG. 4 (some microcontrollers could perform this function using built-in ADCs but typically there are not enough channels). Component 80 outputs signals 89 on a path to the DUT. Return signals also pass through component 80, in particular, through front-end module 10 as described herein.

Figure 6:
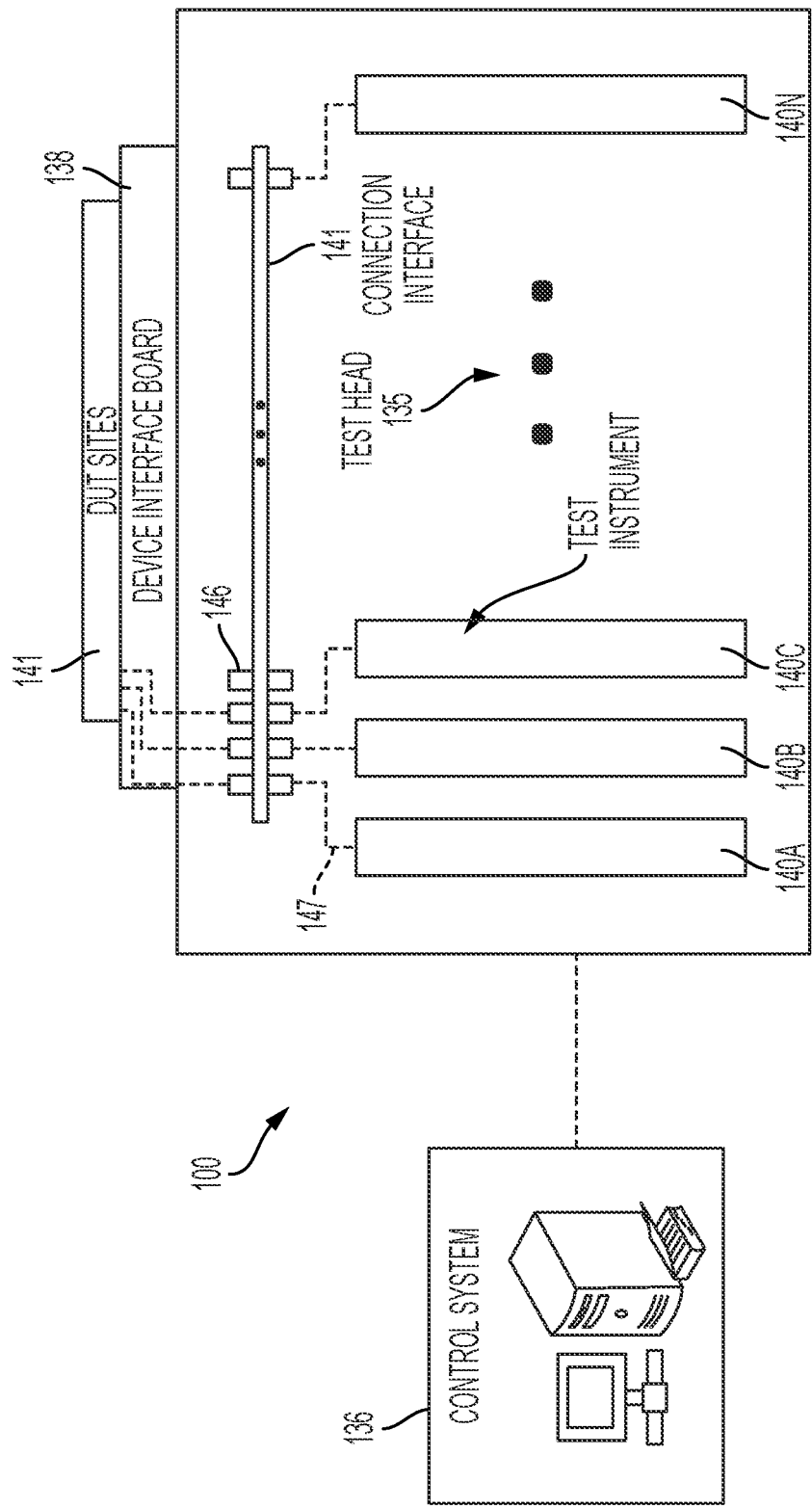
FIG. 6 is a block diagram of components of an example test system that may include the example front-end module.

FIG. 6 shows components of example ATE 14 that may include a device interface board (DIB) or probe interface board (PIB) 138 (also referred to as a load board) which may include at least part of the channel to a DUT described herein. ATE 14 may be part of test system. In FIG. 6, the dashed lines represent, conceptually, potential signal paths between components of the test system.

ATE 14 includes a test head 135 and a control system 136. The control system may include a computing system that includes one or more microprocessors or other appropriate processing devices as described herein.

DIB 138 is or includes a printed circuit board (PCB) that is connected to test head 135 and that includes mechanical and electrical interfaces to one or more DUTs that are being tested or are to be tested by the ATE. The DIB includes sites 141, which may include pins, ball grid arrays (BGAs), conductive traces, or other points of electrical and mechanical connection to which the DUTs may connect. Test signals, response signals, voltage signals, and other signals pass through test channels over the sites between the DUTs and test instruments. DIB 138 may also include, among other things, connectors, conductive traces, and circuitry for routing signals between the test instruments, DUTs connected to sites 141, and other circuitry. In this example, DIB 138 includes one or more connectors for connection to signal transmission lines or coaxial cables for transmitting signals between one or more test instruments and one or more DUTs. DIB 138 also includes one or more transmission lines having structures such as those described herein to transmit signals to and from the DUT.

Control system 136 communicates with components of the test head to control testing. For example, control system 136 may download test program sets to test instruments 140A to 140N in the test head. The test instruments include hardware devices that may include one or more processing devices and other circuitry. Test instruments 140A to 140N may run the test program sets to test DUTs in communication with the test instruments. Control system 136 may also send, to test instruments in the test head, instructions, test data, and/or other information that are usable by the test instruments to perform appropriate tests on DUTs interfaced to the DIB. In some implementations, this information may be sent via a computer or other type of network or via a direct electrical path. In some implementations, this information may be sent via a local area network (LAN) or a wide area network (WAN).

A test program generates a test flow to provide to the DUT. The test flow is written to output signals to elicit a response from the DUT, for example. The test flow may be written to output signals including RF signals, microwave signals, and/or mm-wave signals to one or more DUTs, to receive responses to those signals from the DUTs, and to analyze the response to determine if a device passed or failed testing.

In the example of FIG. 6, ATE 14 includes multiple test instruments 140A to 140N, each of which may be configured, as appropriate, to perform one or more of testing and/or other functions. Although only four test instruments are depicted, the system may include any appropriate number of test instruments, including those residing outside of test head 135. In some implementations, one or more test instruments may be configured to output RF, centimeter-wave, or mm-wave signals to test a DUT based, e.g., on data provided by the control system, and to receive response signals from the DUT. Test instruments such as these may include one or more of front-end modules or a variant thereof as described herein. Such a test instrument may also include the signal source, the signal receiver, and the controllers or processing devices described above. In some implementations, that functionality is performed by computing system, which is separate from the test instrument. In some implementations, a front-end module of the type described herein may be included on the DIB rather than on a test instrument.

In some examples, ATE 14 includes a connection interface 141 that connects test instrument test channels 147 to DIB 138. Connection interface 144 may include connectors 146 or other devices for routing signals between the test instruments and DIB 138. For example, the connection interface may include one or more circuit boards or other substrates on which such connectors are mounted. Conductors that are included in the test channels may be routed through the connection interface and the DIB.

In some implementations, the front-end module and its variants described herein may reduce signal loss relative to its conventional counterparts. In some examples, signal loss may be reduced by 20 decibels (dB) by the elimination of the usual signal path circuitry needed for a VNA (variable noise amplifier). In some implementations, the front-end module and its variants described herein implement traditional ATE channel functionality using simplified circuitry configured for RF, centimeter-wave, and mm-wave applications. This architecture may simplify the ATE channel's signal path, which may reduce total signal losses to the DUT. In some examples, these features can be particularly advantageous in centimeter-wave and mm-wave applications, where cables and PCB (printed circuit board) dielectrics introduce large signal losses (e.g., 10+dB versus about 3 dB below 8 GHz), which reduces maximum output power deliverable to the DUT, degrades s-parameter measurement, and decreases the system SNR.

The architecture may also reduce cost in comparison with more traditional ATE channels that involve switching among multiple paths and separate source and measure conversions when configured to use a single bidirectional conversion path. Vector s-parameters may be determined in this architecture using a scalar circuit (known as a "6-port"), which may reduce cost, signal loss, switching, and signal routing when used in an ATE context. Reduced circuit complexity can be integrated into a SiP (system-in-package) or MCM (multi-chip module) device. Reduced size enable closer placement to the DUT (e.g., on a DIB or probe interface board (PIB) or membrane) to further reduce losses between the instrument channel and the DUT. As such, the front-end module reduce channel cost and increase our count while improving achievable performance, particularly at higher frequencies.

All or part of the test systems and processes described in this specification and their various modifications may be configured or controlled at least in part by one or more computers such as control system 136 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the voltage source, the test system, and processes described herein can be performed by one or more programmable processors executing one or more computer programs to control all or some of the well formation operations described previously. All or part of the test systems and processes can be configured or controlled by special purpose logic circuitry, such as, an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Any "electrical connection" as used herein may include a direct physical connection or a wired or wireless connection that includes or does not include intervening components but that nevertheless allows electrical signals to flow between connected components. Any "connection" involving electrical circuitry that allows signals to flow, unless stated otherwise, is an electrical connection and not necessarily a direct physical connection regardless of whether the word "electrical" is used to modify "connection".

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A front-end module that is part of a channel to connect to a device under test (DUT), the front-end module comprising:
   a transmission line connecting the DUT and the front-end module that is configured for bidirectional transmission of oscillating signals including test signals and response signals;
   in-phase and quadrature (IQ) circuitry configured to modulate a test signal for transmission over the transmission line to the DUT and to demodulate a response received over the transmission line from the DUT; and
   at least four taps into the transmission line to obtain direct current (DC) voltage values based on amplitudes of the oscillating signals, where scattering (s) parameters of the channel are based on calculations using the DC voltage values;
   wherein the front-end module comprises at least six ports, the at least six ports comprising an input/output (I/O) port directed to signal circuitry, a DUT port directed to the DUT, and at least four ports for the at least for taps.

2. The front-end module of claim 1, wherein the signal circuitry comprises a signal source, and the I/O port is configured to receive a modulated version of the test signal.

3. The front-end module of claim 1, wherein the signal circuitry comprises a signal receiver, and the I/O port is configured to output the response signal towards circuitry of the signal receiver.

4. The front-end module of claim 1, wherein the at least six ports comprise the at least four taps to obtain DC voltage values representing power or voltage of the oscillating signals.

5. The front-end module of claim 1, wherein the oscillating signals are within a radio frequency (RF) range, millimeter (mm) wave frequency range, or a centimeter (cm) wave frequency range.

6. The front-end module of claim 1, wherein the oscillating signals have frequencies of at least 55 gigahertz (GHz).

7. The front-end module of claim 1, wherein one or more of the at least four taps comprises:
   a diode coupled to the transmission line; and
   a low-pass filter in series with the diode to obtain a DC voltage value based on voltage or power of an oscillating signal on the transmission line at the taps.

8. The front-end module of claim 7, wherein a dimension of the transmission line is controllable to compensate transmission line impedance for changes caused by diodes at the at least four taps.

9. The front-end module of claim 1, wherein one or more of the at least four taps comprises a sampling diode coupled to the transmission line; and
   wherein the front-end module further comprises one or more measuring diodes physical mounted proximate to the sampling diode for measuring temperature of the sampling diodes.

10. The front-end module of claim 1, wherein a connection between the channel and the DUT is unswitched.

11. The front-end module of claim 1, wherein the IQ circuitry comprises mixer circuitry, where the mixer circuitry comprises bidirectional circuitry.

12. The front-end module of claim 11, wherein the mixer circuitry comprises a double-balanced mixer.

13. The front-end module of claim 11, wherein the mixer circuitry comprises uni-directional mixers, each configured to operate in a different direction.

14. The front-end module of claim 11, wherein the mixer circuitry is configured to separate signals into two paths comprising a forward path and a reverse path.

15. The front-end module of claim 1, further comprising:
a triplexer to separate and to combine digital control and data signals, an oscillating test signal, and DC power;
a microcontroller to extract and to insert control signals and data into the triplexer; and
memory to store calibration values for use in calculating error corrections comprising at least one of calibrating the voltage values from the at least four taps, correcting for temperature, or calibrating s-parameter measurements.

16. The front-end module of claim 15, wherein the memory stores temperature values associated with the at least four taps used to calculate calibrations.

17. The front-end module of claim 15, wherein the memory stores calibration values for the IQ circuitry.

18. The front-end module of claim 15, wherein the memory stores calibration values to calibrate linearity of voltages from the at least four taps.

19. A test system comprising:
the front-end module of claim 1, and
one or more processing devices to generate the s-parameters using the DC voltage values.

20. The test system of claim 19, wherein the one or more processing devices are configured to generate calibration values during manufacturing.

21. A test system comprising:
the front-end module of claim 1;
a signal source to provide the test signal to the IQ circuitry;
a signal receiver to receive the response signal from the IQ circuitry, the signal source and the signal receiver comprising the signal circuitry; and
an interface board to which the DUT is connected, the channel being at least partly on the interface board.

22. The test system of claim 21, wherein the front-end module is an RF test instrument or is a component of an RF test instrument.

23. The test system of claim 21, wherein the channel is partly on the interface board;
wherein an input to the front-end module comprises one or more of an IQ-modulated baseband, an intermediate frequency, a local oscillator (LO) signal, a control signal, or a direct-current (DC) supply signal.

24. A test system comprising:
a front-end module that defines a channel to connect to a device under test (DUT), the front-end module comprising:
a transmission line connectable to the DUT and configured for bidirectional transmission of oscillating signals including test signals and response signals; and
circuitry configured to modulate a test signal for transmission over the transmission line to the DUT and to demodulate a response received over the transmission line from the DUT; and
one or more processing devices to generate scattering (s) parameters for the channel based on direct current (DC) values obtained at different locations along the transmission line;
wherein the front-end module comprises at least six ports, the at least six ports comprising an input/output (I/O) port directed to signal circuitry, a DUT port directed to the DUT, and at least four ports for accessing the transmission line at different locations to obtain the DC values.

25. The test system of claim 24, wherein the oscillating signals are between an RF frequency range and a millimeter (mm) wave frequency range inclusive.

26. The test system of claim 24, wherein the oscillating signals have frequencies of at least 55 gigahertz (GHz).

27. A test system comprising:
means for enabling bidirectional transmission of oscillating signals between a test instrument and a device under test (DUT);
means for obtaining direct current (DC) values for a signal among the oscillating signals at different points along a transmission line conducting a waveform of an oscillating signal; and
means for generating scattering (s) parameters based on the DC values;
wherein the means for obtaining comprises at least one test channel, the at least one test channel comprising at least six ports including ports through which the DC values are obtainable.

28. The test system of claim 27, wherein the oscillating signals are within an RF frequency range, within a millimeter (mm) wave frequency range, or within a centimeter (cm) wave frequency range.

29. The test system of claim 27, wherein the oscillating signals have frequencies of at least 55 gigahertz (GHz).

30. The test system of claim 27, wherein the means for enabling comprises a transmission line that is connected to the DUT through an unswitched connection.

31. The test system of claim 27, wherein the means for enabling comprises in-phase and quadrature (IQ) circuitry.

* * * * *

UNITED STATES PATENT AND TRADEMARK OFFICE
CERTIFICATE OF CORRECTION

PATENT NO. : 11,431,379 B1
APPLICATION NO. : 17/219219
DATED : August 30, 2022
INVENTOR(S) : Brian C. Wadell It is certified that error appears in the above-identified patent and that said Letters Patent is hereby corrected as shown below:

In the Claims

In Claim 1, Column 12, Line 26 please replace the words "for taps." and insert the words -- four taps. --.

Signed and Sealed this
Twenty-fifth Day of October, 2022

Katherine Kelly Vidal
*Director of the United States Patent and Trademark Office*